US012775179B2

(12) United States Patent
Steinberg et al.

(10) Patent No.: US 12,775,179 B2
(45) Date of Patent: Oct. 27, 2026

(54) DIFFERENTIAL TRAVELING WAVE ELECTRO-ABSORPTION MODULATOR FOR HIGH BANDWIDTH OPERATION

(71) Applicant: Mellanox Technologies, Ltd., Yokneam (IL)

(72) Inventors: Oren Steinberg, Tal Shahar (IL); Moshe B. Oron, Rehovot (IL); Isabelle Cestier, Haifa (IL); Elad Mentovich, Tel Aviv (IL); Timothy De Keulenaer, Ghent (BE); Jochem Verbist, Edegem (BE)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 273 days.

(21) Appl. No.: 18/120,719

(22) Filed: Mar. 13, 2023

(65) Prior Publication Data

US 2024/0310660 A1 Sep. 19, 2024

(51) Int. Cl.
*G02F 1/015* (2006.01)
*G02F 1/017* (2006.01)

(52) U.S. Cl.
CPC ........ *G02F 1/0157* (2021.01); *G02F 1/01708* (2013.01); *G02F 2201/127* (2013.01)

(58) Field of Classification Search
CPC ......................... G02F 1/0157; G02F 2201/127
USPC .......................................................... 385/1-3
See application file for complete search history.

(56) References Cited

U.S. PATENT DOCUMENTS 6,345,131 B1 2/2002 Jang
6,597,011 B1 7/2003 Atanackovic
6,914,706 B2 * 7/2005 Ishimura ............... B82Y 20/00 359/254

(Continued)

FOREIGN PATENT DOCUMENTS

CN 108563041 A * 9/2018 ............ G02F 1/015
EP 3462232 B1 9/2017

(Continued)

OTHER PUBLICATIONS

"Very low input voltage cascaded travelling wave electroabsorption modulator (CTWEAM) for more than 100 Gbps" by Islam et al., Optics Communications, vol. 297, pp. 43-47 (Year: 2013).*

(Continued)

*Primary Examiner* — Robert Tavlykaev
(74) *Attorney, Agent, or Firm* — ALSTON & BIRD LLP

(57) ABSTRACT

Systems and methods are described herein for an electro-absorption modulator (EAM) device. An example EAM device comprises an optical waveguide comprising a wave-guide core configured to facilitate propagation of an optical signal therethrough; a segmented structure comprising diode segments disposed on the waveguide; and a differential electrical transmission line operatively coupled to the diode segments. The electrical transmission line includes a first transmission rail and a second transmission rail, and the electrical transmission line is configured to facilitate propagation of an electrical signal therethrough. The EAM device is configured for operation by a differential radio frequency (RF) source that is configured to supply the electrical signal to the EAM device, and the EAM device is formed on a semi-insulating substrate.

19 Claims, 6 Drawing Sheets

(56) References Cited

U.S. PATENT DOCUMENTS

| | | | | |
|---|---|---|---|---|
| 7,010,179 | B2 * | 3/2006 | Hatta | G02F 1/025 359/254 |
| 7,409,123 | B1 | 8/2008 | Feng | |
| 7,542,641 | B1 | 6/2009 | Asghari | |
| 7,658,552 | B2 | 2/2010 | Asghari | |
| 7,917,035 | B2 | 3/2011 | Asghari | |
| 8,090,231 | B1 | 1/2012 | Asghari | |
| 8,160,404 | B2 | 4/2012 | Pan | |
| 8,242,432 | B2 | 8/2012 | Feng | |
| 8,346,028 | B2 | 1/2013 | Feng | |
| 8,411,260 | B1 | 4/2013 | Feng | |
| 8,463,088 | B1 | 6/2013 | Asghari | |
| 8,476,576 | B2 | 7/2013 | Dong | |
| 8,526,769 | B1 | 9/2013 | Feng | |
| 8,638,485 | B2 | 1/2014 | Feng | |
| 8,724,100 | B1 | 5/2014 | Asghari | |
| 8,728,837 | B2 | 5/2014 | Fong | |
| 8,737,772 | B2 | 5/2014 | Dong | |
| 8,817,354 | B2 | 8/2014 | Feng | |
| 8,897,606 | B2 | 11/2014 | Asghari | |
| 8,965,208 | B2 | 2/2015 | Asghari | |
| 8,989,522 | B2 | 3/2015 | Qian | |
| 9,025,241 | B2 | 5/2015 | Asghari | |
| 9,142,698 | B1 | 9/2015 | Cunningham | |
| 9,217,831 | B1 | 12/2015 | Asghari | |
| 9,217,836 | B2 | 12/2015 | Asghari | |
| 9,244,327 | B2 | 1/2016 | Prosyk | |
| 9,274,353 | B1 | 3/2016 | Dong | |
| 9,279,936 | B2 | 3/2016 | Qian | |
| 9,312,960 | B1 | 4/2016 | Feng | |
| 9,379,515 | B1 | 6/2016 | Asghari | |
| 9,588,294 | B2 | 3/2017 | Fong | |
| 9,702,278 | B2 | 7/2017 | Gruener | |
| 9,798,166 | B1 | 10/2017 | Sharma | |
| 9,952,456 | B2 | 4/2018 | Huang | |
| 9,966,733 | B2 | 5/2018 | Feng | |
| 9,991,965 | B2 | 6/2018 | Christensen | |
| 10,031,355 | B2 | 7/2018 | Feng | |
| 10,078,232 | B1 | 9/2018 | Vermeulen | |
| 10,288,805 | B2 | 5/2019 | Luff | |
| 10,330,864 | B2 | 6/2019 | Asghari | |
| 10,394,060 | B2 | 8/2019 | Mentovich | |
| 10,649,244 | B1 | 5/2020 | Mentovich | |
| 10,895,797 | B2 | 1/2021 | Cavaliere | |
| 11,397,363 | B2 | 7/2022 | Kawakami | |
| 2003/0147574 | A1 * | 8/2003 | Lam | B82Y 20/00 385/40 |
| 2007/0009195 | A1 | 1/2007 | Eriksson et al. | |
| 2008/0170821 | A1 * | 7/2008 | Kissa | G02F 1/0316 385/14 |
| 2009/0297088 | A1 * | 12/2009 | Koh | G02F 1/0356 385/2 |
| 2010/0330727 | A1 | 12/2010 | Hill | |
| 2012/0251029 | A1 | 10/2012 | Kobrinsky | |
| 2013/0182305 | A1 | 7/2013 | Feng | |
| 2015/0010263 | A1 | 1/2015 | Fong | |
| 2015/0055911 | A1 | 2/2015 | Bowers | |
| 2015/0180210 | A1 * | 6/2015 | Yu | G02B 6/12002 438/24 |
| 2016/0119062 | A1 * | 4/2016 | Christensen | H04B 10/505 398/183 |
| 2016/0349541 | A1 * | 12/2016 | Velthaus | G02F 1/0121 |
| 2017/0269391 | A1 | 9/2017 | Feng | |
| 2017/0351124 | A1 | 12/2017 | Roth | |
| 2018/0129082 | A1 * | 5/2018 | Lin | G02F 1/025 |
| 2018/0314128 | A1 | 11/2018 | Sun | |
| 2019/0179177 | A1 | 6/2019 | Rickman | |
| 2019/0187495 | A1 | 6/2019 | Melikyan et al. | |
| 2019/0293971 | A1 | 9/2019 | Yu | |
| 2020/0012043 | A1 | 1/2020 | Abediasl | |
| 2020/0124878 | A1 | 4/2020 | Yu | |
| 2021/0191164 | A1 | 6/2021 | Mentovich | |
| 2021/0226409 | A1 | 7/2021 | Grillanda et al. | |
| 2021/0336418 | A1 | 10/2021 | Lakovlev | |
| 2022/0236619 | A1 | 7/2022 | Hoessbacher | |
| 2022/0337321 | A1 | 10/2022 | Argyris | |
| 2023/0018578 | A1 | 1/2023 | Bakopoulos | |
| 2023/0127711 | A1 | 4/2023 | Maglio et al. | |
| 2024/0027706 | A1 * | 1/2024 | Tadayon | G02B 6/4214 |

FOREIGN PATENT DOCUMENTS

| | | | |
|---|---|---|---|
| WO | 2020149953 | A1 | 7/2020 |
| WO | 2022200292 | A1 | 9/2022 |

OTHER PUBLICATIONS

"GeSi modulator based on two-mode interference" by Li et al, Applied Optics, vol. 53, No. 2, pp. 221-225 (Year: 2014).*

"Push-pull driven electro-absorption modulator integrated with DFB laser using selectively doped lateral pin diode structure" by Hasebe et al, IEEE International Semiconductor Laser Conference, pp. 54-55 (Year: 2014).*

Ackermann, M. et al., "Sub-wavelength tunneling barrier in rib waveguide microring modulators with vanishing pending losses," Opt. Lett. 47, 2626-2629 (2022).

Akiyama, S. et al. "Cascaded-ring-resonator-loaded Mach-Zehnder modulator for enhanced modulation efficiency in wide optical bandwith," Opt. Expr. 20, 16321-16338 (2012).

Akiyama, Suguru et al. "InP-Based Mach-Zehnder Modulator With Capacitively Loaded Travelling-Wave Electrodes," Journal of Lightwave Technology, vol. 26, No. 5, Mar. 1, 2008, pp. 608-615, DOI: 10.1109/JLT.2007.915278.

Chacinski, Marck et al. "Monolithically Integrated 100 GHz DFB-TWEAM," Journal of Lightwave Technology, vol. 27, No. 16, Aug. 15, 2009, pp. 3410-3415, DOI: 10.1109/JLT.2009.2015773. Available online: URL: https://opg.optica.org/jlt/abstract.cfmuri=jlt-27-16-3410.

Cui, Yansong et al. "Modeling and Design of GaAs Traveling-Wave electrooptic Modulators Based on Capacitively Loaded Coplanar Strips," Journal of Lightwave Technology, vol. 24, No. 1, Jan. 2006, pp. 544-554, DOI: 10.1109/JLT.2005.859851.

J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4.

Jafari, O. et al., "Mach-Zehnder silicon photonic modulator assisted by phase-shifted bragg gratings," Photon. Technol. Lett. 32, 445-448 (2020).

K. Yonenaga and S. Kuwano, "Dispersion-Tolerant Optical Transmission System Using Duobinary Transmitter and Binary Receiver," IEEE J. Lightwave Technol., vol. 15, No. 8, pp. 1530-1537, 1997.

Klein, H.N. et al. "1.55μm Mach-Zehnder Modulators on InP for Optical 40/80 Gbit/s Transmission Networks," In 2006 International Conference on Indium Phosphide and Related Materials Conference Proceedings, May 8, 2006, pp. 171-173, IEEE.

Lange, Sophie et al. "100 GBd Intensity Modulation and Direct Detection With An InP-Based Monolithic DFB Laser Mach-Zehnder Modulator," Journal of Lightwave Technology, vol. 36, No. 1, Jan. 1, 2018, pp. 97-102.

Lange, Sophie et al. "Low Switching Voltage Mach-Zehnder Modulator Monolithically Integrated With DFB Laser for Data Transmission Up To 107.4 GB/s," Journal of Lightwave Technology, vol. 34, No. 2, Jan. 15, 2016, pp. 401-406, DOI: 10.1109/JLT.2015.2496426.

Li, G.L. et al. "Analysis Of Segmented Traveling-Wave Optical Modulators," Journal of Lightwave Technology, vol. 22, No. 7, Jul. 2004, pp. 1789-1796, DOI: 10.1109/JLT.2004.831179. Available online: URL: https://opg.optica.org/jlt/abstract.cfmuri=jlt-22-7-1789.

Li, G.L. et al. "Numerical Modeling of Segmented Traveling-Wave Electroabsorption Modulators," In 2004 IEE MTIT-S International Microwave Symposium Digest (IEEE Cat. No. 04CH37535), Jun. 6, 2004, vol. 2, pp. 773-776, IEEE.

Margalit, N. et al., "Perspectives on the future of silicon photonics and electronics, " Appl. Phys. Lett. 118, 220501 (2021).

Nan Qi et al., Co-Design and Demonstration of a 25 Gbps Silicon-

(56) References Cited

OTHER PUBLICATIONS

Photonic Mach Zehnder Modulator with a CMOS Based High Swing Driver, IEEE, Nov. 2016, pp. 1-11 (Year: 2016).
Ogiso, Yoshihiro et al. "Over 67 GHZ Bandwidth and 1.5 V Vp InP-Based Optical IQ Modulator With n-i-p-n Heterostructure," Journal of Lightwave Technology, vol. 35, No. 8, Apr. 15, 2017, pp. 1450-1455, DOI: 10.1109/JLT.2016.2639542.
Qian, Guang et al. "CL-TWE Mach-Zehnder Electro-Optic Modulator Based on InP-MQW Optical Waveguides," Chinese Optics Letters, vol. 17, No. 6, Jun. 2019, pp. 061301-1-061301-5, DOI: 10.3788/COL201917.061301.
Romero-Garcia, Sebastian et al., "High-speed resonantly enhanced silicon photonics modulator with a large operating temperature range", Optic Letters, vol. 42, Issue 1, pp. 81-84 (2017). https://doi.org/10.1364/OL.42.000081.
Sharif Azadeh, S. et al., "Low Vp silicon photonics modulators with highly linear epitaxially grown phase shifters," Opt. Expr. 23, 23526-23550 (2015).
Stepanenko, M. et al. "Optimization of RF Electrodes for Electro-Optic Modulator Based on Quantum-Confined Stark Effect," In Journal of Physics: Conference Series 2019, vol. 1145, No. 1:012028, pp. 1-6, IOP Publishing.
Stepanenko, Mikhail et al. "Multi-Parameter Optimization of an InP Electro-Optic Modulator," Symmetry, vol. 12, Nov. 21, 2020, pp. 1-18, DOI: 10.3390/sym12111920.
Terada, Y. et al., "Full C-band Si photonic crystal waveguide modulator," Opt. Lett. 42, 5110-5112 (2017).
U.S. Appl. No. 18/110,206, filed Feb. 15, 2023, entitled "System For In-Band Spectral Cross-Talk Monitoring".
Velthaus, K.-O. et al. "High Performance InP-Based Mach-Zehnder Modulators for 10 to 100 GB/s Optical Fiber Transmission Systems," 23rd International Conference on Indium Phosphide and Related Materials—IPRM 2011, May 22-26, 2011, (4 pages), Berlin, Germany.
Wang, Gary et al. "Low Vp, High Bandwidth, Small Form Factor InP Modulator," in 2014 IEEE Avionics, Fiber-Optics and Photonics Technology Conference (AVFOP), Nov. 11, 2014, pp. 41-42, IEEE.
Witzens, J., "High-Speed silicon photonics modulators," Proc. IEEE 106, 2158-2182 (2017).
Yamazaki, Hiroshi et al. "IMDD Transmission at Net Data Rate of 333 GB/s Using Over-100-GHz-Bandwidth Analog Multiplexer and Mach-Zehnder Modulator," Journal of Lightwave Technology, vol. 37, No. 8, Apr. 15, 2019, pp. 1772-1778, DOI: 10.1109/JLT.2019.2898675.
Han, C. et al., "Recent progress in silicon-based slow-light electro-optic modulators," Micromachines 13, 400 (2022).
Han, C. et al., "Ultra-compact silicon modulator with 110 GHz bandwith," in Proc. Opt. Fib. Comm. Conf. (OFC), (Optica Publishing Group, Washington, D.C. 2022), p. Th4C.5.
Horikawa, T. et al., "A 300-nm silicon photonics platform for large-scale device integration," J. Sel. Top. Quant. Electron, 24, 8200415 (2018).
Related U.S. Appl. No. 63/266,527, filed Jan. 7, 2022, entitled "High Bandwidth Travelling Wave Electro Absorption Modulator (EAM) Chip".
Related U.S. Appl. No. 17/644,625, filed Dec. 16, 2021, entitled "High Bandwidth Optical Modulator".
Related U.S. Appl. No. 17/694, 159, filed Mar. 14, 2022, entitled "Serial Data Conversion Redundacy Using Optical Modulators".
Related U.S. Appl. No. 17/810,068, filed Jun. 30, 2022, entitled "High Bandwidth Travelling Wave Electro Absorption Modulator (EAM) Chip".
Related U.S. Appl. No. 17/993,296, filed Nov. 23, 2022, entitled "Traveling Wave Cascaded Micro Ring Modulators".
Related U.S. Appl. No. 18/120,802, filed Mar. 13, 2023, entitled "Low Voltage Traveling Wave Electro-Absorption Modulator for High Bandwidth Operation".
Nakai, Y. et al. (2019), "Uncooled Operation of 53-GBd PAM4 (106-GB/s) EA/DFB Lasers With Extremely Low Drive Voltage With 0.9 Vpp," Journal of Lightwave Technology, vol. 37, Issue 7, pp. 1658-1662.
Tamura, M. et al. (2003), "High-speed electroabsorption modulators using ruthenium-doped SI—InP: impact of Interdiffusion-free burying technology on E/O modulation characteristics," International Conference on Indium Phosphide and Related Materials, 2003. pp. 491-494.
Hou et al. (2010), "Monolithic 40 GHz passively Mode-locked AlGalnAs/InP 1.55 mm MQW Laser with Surface-etched Bragg Gratings," European Conference on Integrated Optics (ECIO 10).
D. A. B. Miller et al. (1984), "Band-Edge Electroabsorption in Quantum Well Structures: The Quantum-Confined Stark Effect," Phys. Rev. Lett. 53, 2173.
Bin Wang et al. (2022), "Principles of Selective Area Epitaxy and Applications in III-V Semiconductor Lasers Using MOCVD: A Review," Crystals 2022, 12(7), 1011.

* cited by examiner

400

450

DIFFERENTIAL TRAVELING WAVE ELECTRO-ABSORPTION MODULATOR FOR HIGH BANDWIDTH OPERATION

TECHNOLOGICAL FIELD

Example embodiments of the present disclosure relate to traveling wave electro-absorption modulators (TW-EAM) and, more particularly, to a differential TW-EAM (D-TWEAM) design for high bandwidth operation.

BACKGROUND

Next generation optical links, such as XDR optical links at 200 Gigabits per second (Gbps) and GDR optical links at 400 Gbps are often used in large networks, such as those in the telecommunications and data center industries, where the data needs to be transferred quickly and securely. As the need for larger and faster application clusters and cores increases, so does the demand for high data rate interconnects at low power.

Applicant has identified a number of deficiencies and problems associated with current designs of optical modulators for high bandwidth operation. Many of these identified problems have been solved by developing solutions that are included in embodiments of the present disclosure, many examples of which are described in detail herein.

BRIEF SUMMARY

Systems, methods, and computer program products are provided for differential traveling wave electro-absorption modulator (D-TWEAM) for high bandwidth operation.

In one aspect, an electro-absorption modulator (EAM) device is presented. The EAM device comprises an optical waveguide comprising a waveguide core configured to facilitate propagation and modulation of an optical signal therethrough; a segmented structure comprising diode segments disposed on the waveguide; and an electrical transmission line operatively coupled to the diode segments, wherein the electrical transmission line comprises a first transmission rail and a second transmission rail, wherein the electrical transmission line is configured to facilitate propagation of an electrical signal therethrough, wherein the EAM device is configured for operation by a radio frequency (RF) source that is configured to supply the electrical signal to the EAM device, and wherein the EAM device is formed on a semi-insulating substrate.

In some embodiments, the electrical transmission line is a differential electrical transmission line.

In some embodiments, the electrical transmission line is a co-planar strip-line (CPS) transmission line.

In some embodiments, the optical waveguide comprises at least a ridge waveguide or a buried heterostructure (BH) waveguide.

In some embodiments, the first transmission rail is operatively coupled to a first electrode of each diode segment, and the second transmission rail is operatively coupled to a second electrode of each diode segment.

In some embodiments, the first electrode is a cathode and the second electrode is an anode.

In some embodiments, an output end of the electrical transmission line is operatively coupled to a termination load.

In some embodiments, the termination load comprises: a first load resistor comprising a first end and a second end, wherein the first end of the first load resistor is operatively coupled to the first transmission rail, and the second end of the first load resistor is operatively coupled to a ground via a first capacitor; and a second load resistor comprising a first end and a second end, wherein the first end of the second load resistor is operatively coupled to the second transmission rail, and the second end of the second load resistor is operatively coupled to the ground via a second capacitor.

In some embodiments, the first transmission rail is disposed along a first side of the waveguide core, and the second transmission rail is disposed along a second side of the waveguide core.

In some embodiments, the diode segments are disposed on the optical waveguide along the electrical transmission line and are configured to create discrete capacitive loads on the electrical transmission line.

In some embodiments, the first transmission rail is disposed on an organic material having a low dielectric constant, and the second transmission rail is disposed on an epitaxial n-type Indium Phosphide (InP) layer.

In some embodiments, an impedance associated with the electrical transmission line, when unloaded, is within a range of about 80Ω and 200Ω.

In some embodiments, the RF source is directly coupled to an input end of the electrical transmission line without an intermediate single-ended driver circuit.

In some embodiments, the RF source is a differential signal source comprising a differential signal port, wherein the differential signal port is operatively coupled to an input end of the electrical transmission line.

In some embodiments, the optical waveguide comprises alternating active sections and passive sections, wherein each diode segment is disposed on a corresponding active section.

In some embodiments, the waveguide core comprises a continuous multi-quantum wells (MQW) layer stack, wherein portions of the MQW layer stack disposed in the active sections have an energy gap defining an active energy gap value, and portions of the MQW layer stack disposed in the passive sections have an energy gap defining a passive energy gap value, wherein the passive energy gap value is greater than the active energy gap value to maintain low insertion loss.

In some embodiments, the EAM device is monolithically integrated along with a laser source on a same chip.

In some embodiments, the RF source is a Serializer-Deserializer (SerDes) transmitter.

In some embodiments, the diode segments and the electrical transmission line are configured to provide velocity matching between the electrical signal and the optical signal.

In another aspect, an electro-absorption modulator (EAM) device is presented. The EAM device comprises an optical waveguide comprising a waveguide core configured to facilitate propagation and modulation of an optical signal therethrough; a segmented structure comprising diode segments disposed on the optical waveguide; and an electrical transmission line operatively coupled to the diode segments, wherein the electrical transmission line comprises a first transmission rail and a second transmission rail, wherein the electrical transmission line is configured to facilitate propagation of an electrical signal therethrough, wherein the EAM device is configured for operation by a differential radio frequency (RF) source comprising a differential signal port, wherein the differential signal port is operatively coupled to the electrical transmission line and configured to supply an electrical signal to the EAM device.

In yet another aspect, a method of generating an optical output signal using an electro-absorption modulator (EAM)

device is presented. The method comprises: receiving, from a laser source, a continuous wave (CW) light via an optical waveguide, wherein the optical waveguide comprises a segmented structure comprising diode segments disposed thereon, wherein the optical waveguide comprises alternating active sections and passive sections, wherein each diode segment is disposed on a corresponding active section; receiving, from a differential radio frequency (RF) source, an electrical signal having a driving voltage of about 0.9V via an electrical transmission line, wherein the electrical transmission line comprises a first transmission rail and a second transmission rail; generating, using the EAM device, an optical output signal based on at least modulating the CW light; and transmitting the optical output signal via the optical waveguide to an external optical fiber.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1:
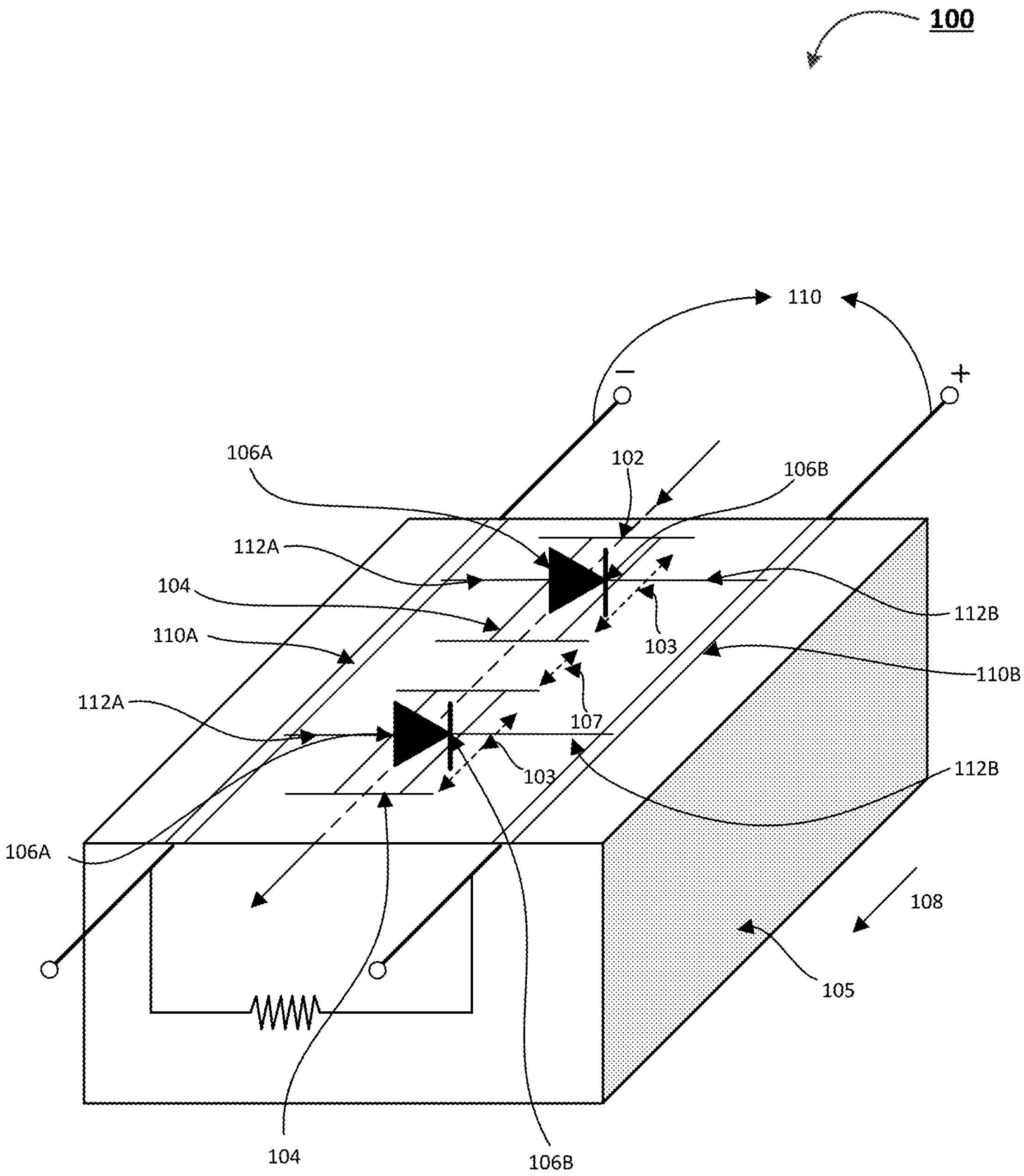
Figure 2A:
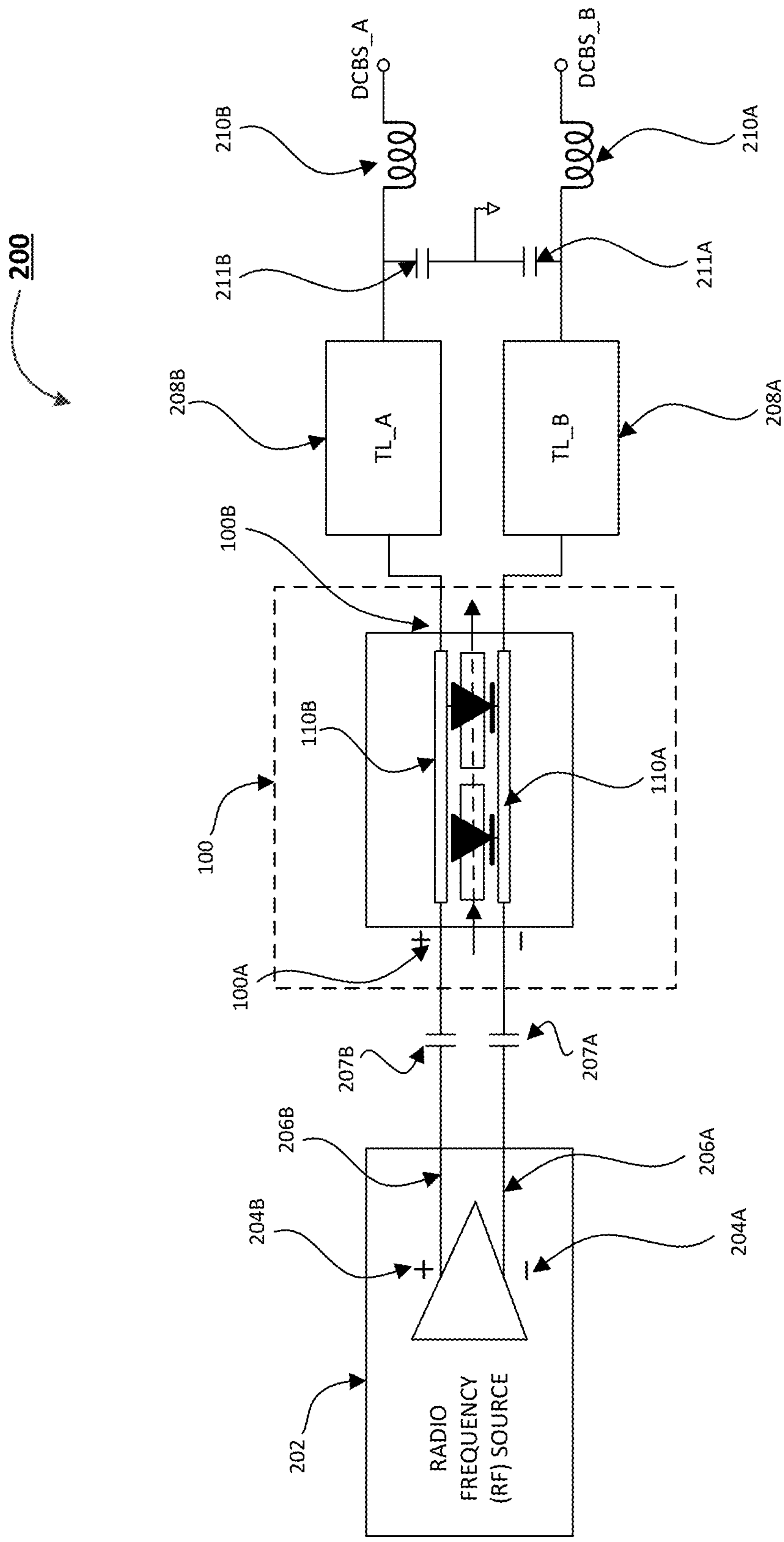
Figure 2B:
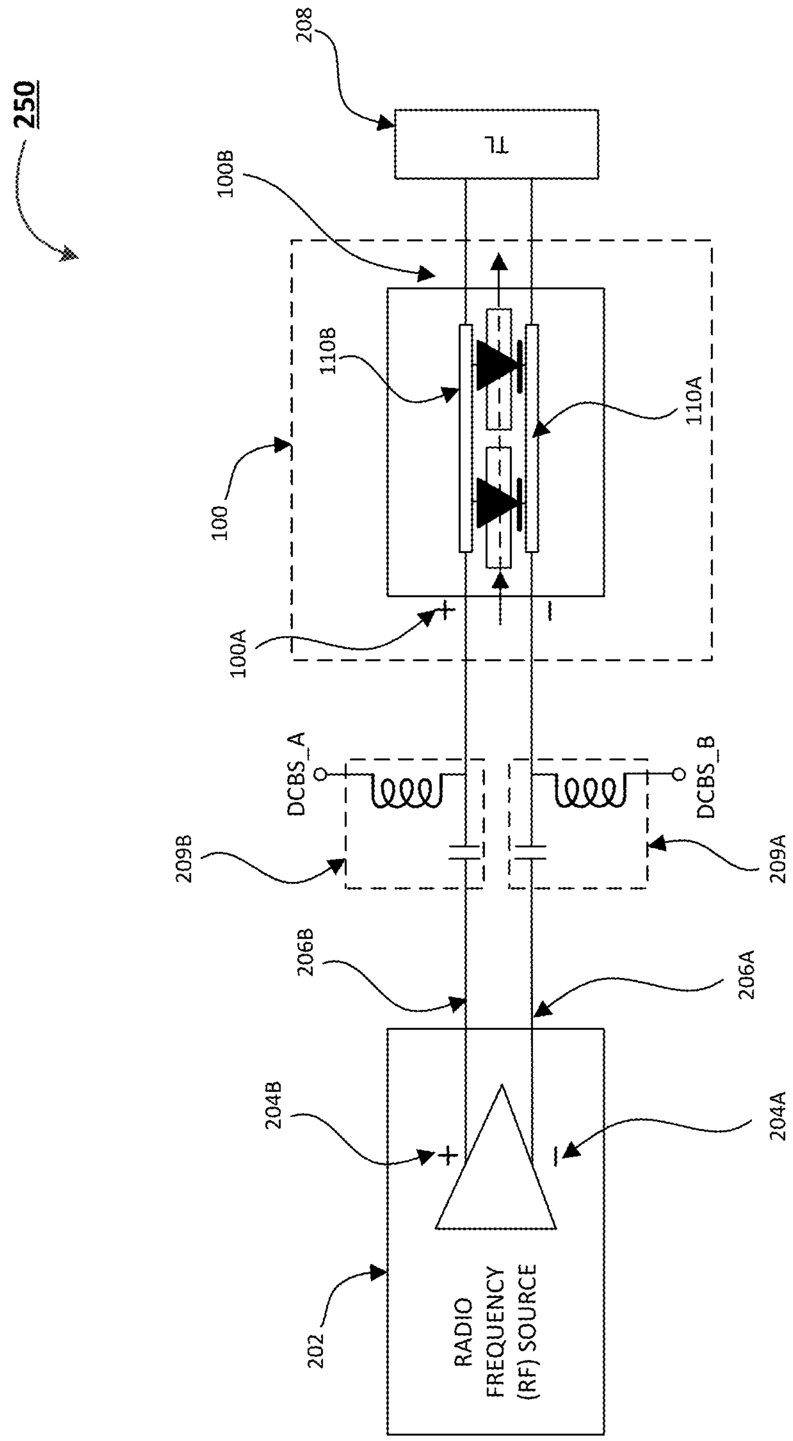
Figure 3:
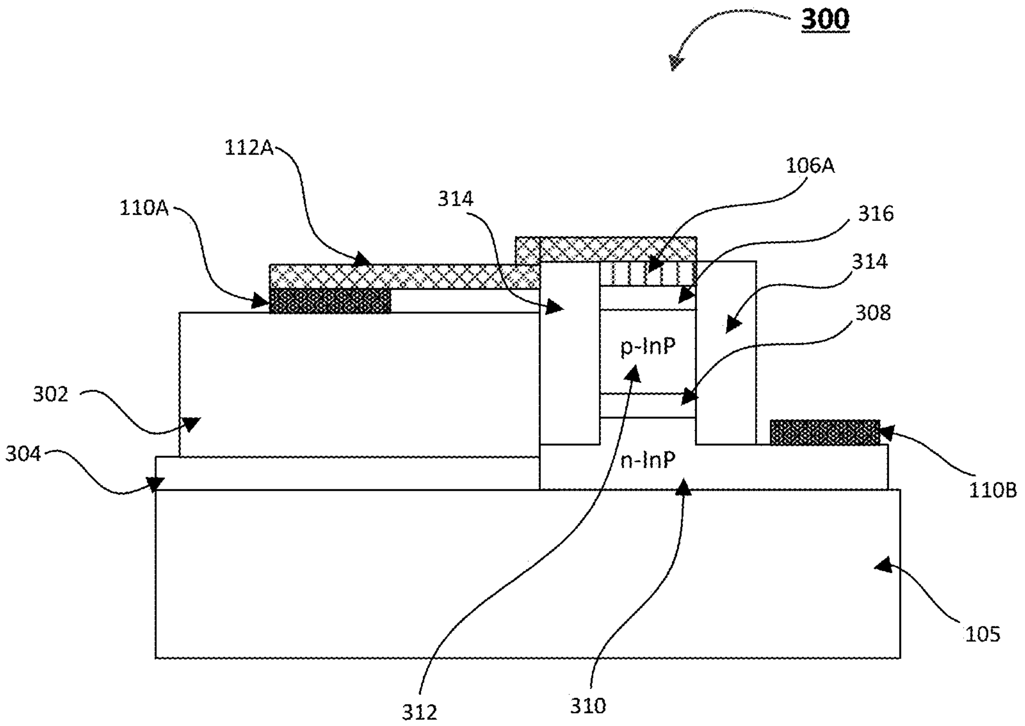
Figure 4A:
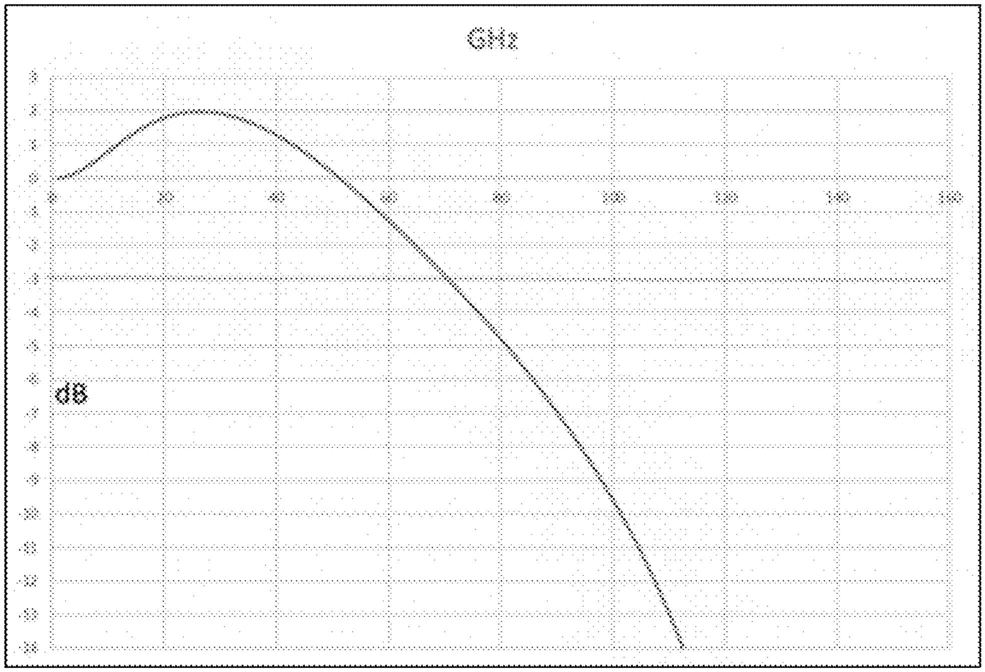
Figure 4B:
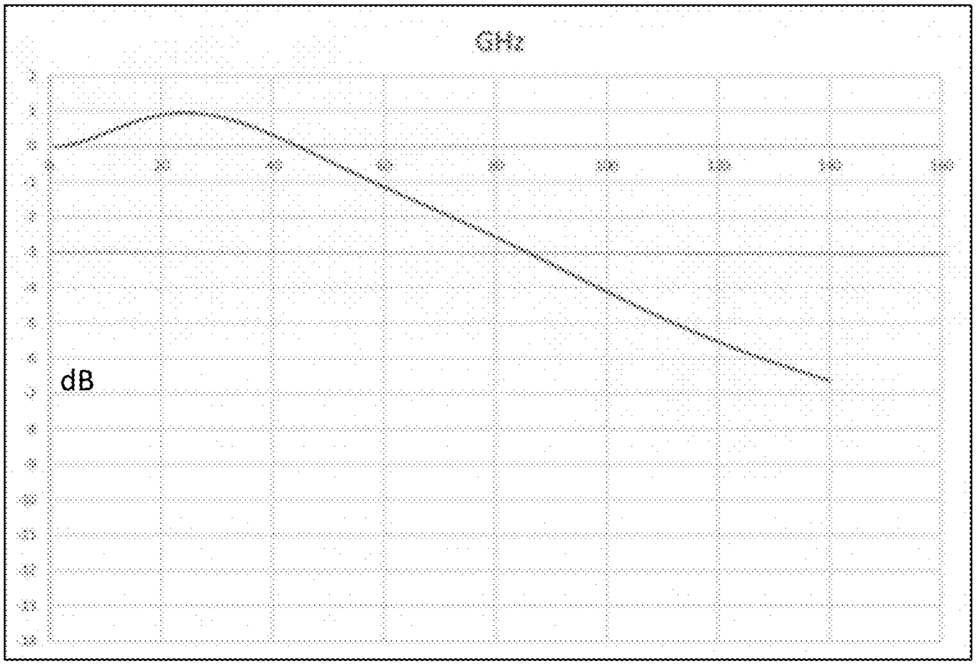
Figure 5:
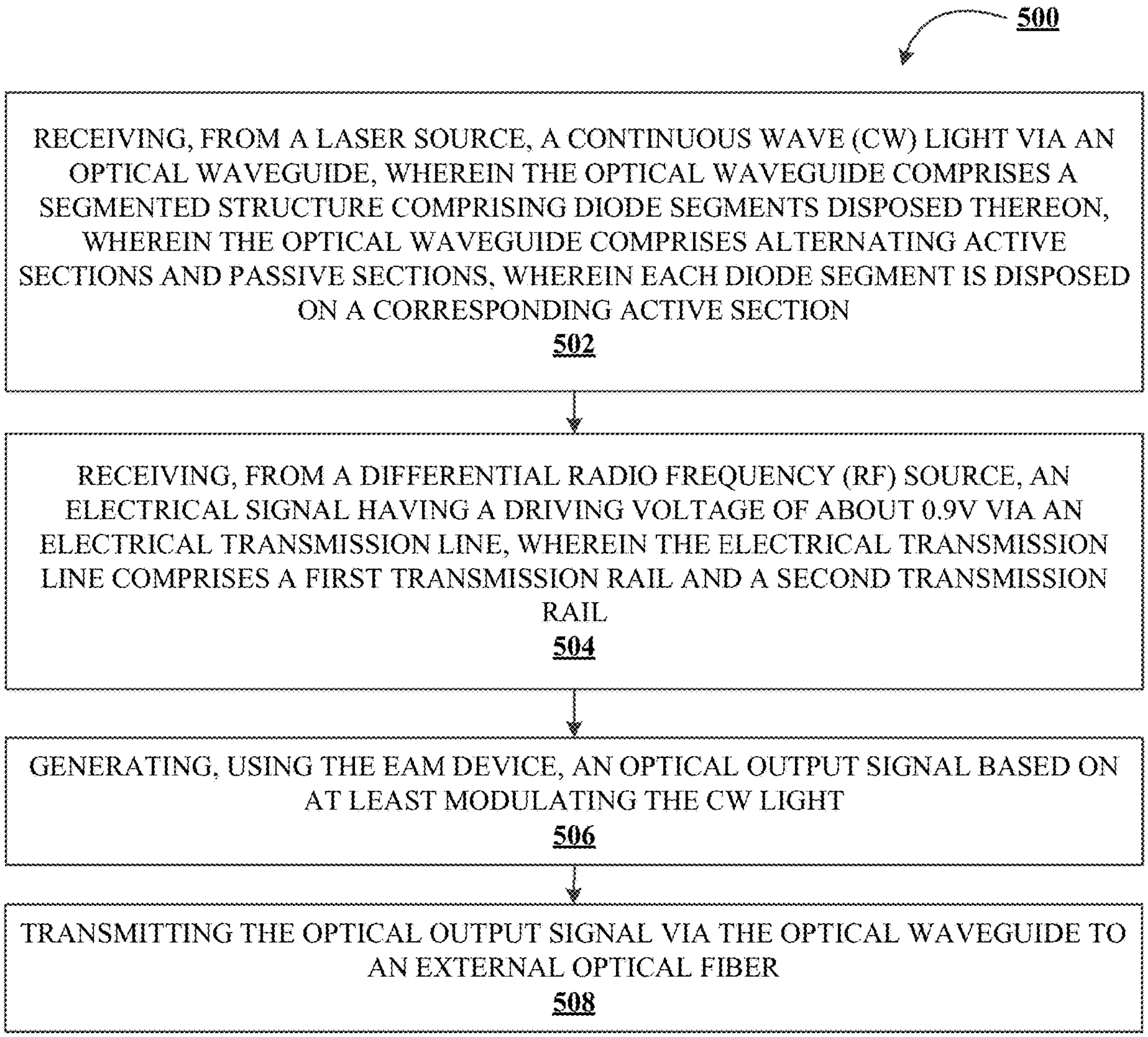

FIG. 1 illustrates a perspective view of an example differential traveling wave electro-absorption modulator (D-TWEAM) device, in accordance with an embodiment of the invention;

FIG. 2A illustrates a D-TWEAM device operatively coupled to an RF source in a first configuration, in accordance with an embodiment of the invention;

FIG. 2B illustrates a D-TWEAM device operatively coupled to an RF source in a second configuration, in accordance with an embodiment of the invention;

FIG. 3 illustrates a partial cross-sectional view of the example D-TWEAM device 100 shown in FIG. 1, in accordance with an embodiment of the invention;

FIG. 4A illustrates a simulated frequency response curve for a single-ended non-traveling wave EAM device driven by a single-ended RF driver with an active modulator length of 100 microns;

FIG. 4B illustrates a simulated frequency response curve for a D-TWEAM device driven by a differential RF source with an active modulator length of 100 microns, in accordance with an embodiment of the invention; and FIG. 5 illustrates a method for generating an optical output signal using a differential traveling wave electro-absorption modulator (D-TWEAM) device, in accordance with an embodiment of the invention.

DETAILED DESCRIPTION

Overview

Next generation optical links, such as XDR optical links and GDR optical links, are used in large networks, where the data needs to be transferred quickly and securely. Transmitters for these optical links convert an electrical signal input into an optical signal that is then transmitted through the optical fiber. In next generation optical transmitters capable of data transmission at high bit rates, externally modulated semiconductors are of high interest because of their potential for high bandwidth operation. External modulators, such as Indium Phosphide (InP) based electro-absorption modulators (EAMs), have often been used for such purposes because they can be monolithically integrated on the same chip with continuous wave (CW) semiconductor light source, such as a laser. The resulting InP based integrated electro-absorption modulated lasers (EMLs) have inherently lower coupling losses, lower power consumption, and lower cost compared to other hybrid solutions. For example, InP based EMLs are often used in large data centers where a large number of optical modulating devices are employed for operation.

In large data centers, digital data is managed by electrical radio frequency (RF) circuitry that uses multiple serializer-deserializer (SerDes) transmitters operating at high bit rates. Such SerDes transmitters use differential RF signaling for driving links made with either copper wires or optical fibers (e.g., optical modulators). Differential RF signaling allows for double signal voltage, common mode and supply noise rejection, improved non-linearity, and potential for high bandwidth operations.

As the need for larger and faster application clusters and cores increases, so does the demand for high data rate interconnects at low power. SerDes transmitter is the building block driving both copper links and optical links. To drive optical links, a voltage driver that is capable of providing a voltage higher than that of the SerDes transmitter is usually introduced between the SerDes transmitter and the optical modulator to create the required single-ended voltage swing for driving the optical modulator, and optionally for biasing purposes. Such drivers are power consuming blocks that add linear and non-linear distortions to the optical signal, as well as extra reflections, due to the addition of yet another component in the link. One way to mitigate such effects is to modify the optical component so that it can be driven directly by the SerDes transmitter differential output (e.g., at an impedance of about 86106 and driving voltage of about 0.9V). Increasing the bandwidth of operation of the optical modulator while using a SerDes transmitter in a direct drive modulation mode reduces the need to compensate for high frequency-dependent loss between the transmitter and the receiver, thus significantly reducing overall power consumption and digital signal processing requirements. What is more, reducing the overall frequency-dependent loss may also allow for efficient analog implementation and low power operation.

The use of SerDes transmitters to directly drive EMLs may have compatibility issues with existing EMLs as the SerDes transmitter employs differential RF signaling, while EMLs tend to be single-ended devices. Therefore, a single-ended EML cannot be connected directly to the differential signal output ports of the SerDes transmitter. Instead, the single-ended EML may either be connected through a single-ended driver circuit, or be connected directly between a single differential signal output rail and ground, thus losing half the voltage swing. Furthermore, most EAMs used today are lumped element devices that tend to have bandwidth limitations. A differential RF source has an impedance of almost twice that of a single-ended source (e.g., within a range of 80Ω-100Ω). At that range of impedance, a lumped element EAM coupled directly to such an RF source may suffer significant bandwidth degradation.

To overcome these limitations, embodiments of the present invention use a traveling wave (TW) differential EAM instead of a lumped element EAM. In a TW differential EAM design, operational bandwidth may be increased by distributing the capacitance of the modulator as discrete loads along an electrical transmission line. Accordingly, embodiments of the present invention introduce an EAM that includes a number of segmented diodes arranged in-line along the axis of the waveguide. Furthermore, the segmented diodes are connected with the same polarity between two transmission rails of the differential electrical transmission line, e.g., all the cathodes are connected to one rail, while and all the anodes are connected to the other rail. However, InP based EAMs are typically implemented on n-type InP substrates. In such devices, the cathodes of the EAM diodes and the cathodes of the laser diode are operatively coupled to the n-type substrate, resulting in high capacitance to ground. Due to this effect, all the cathodes of the segmented diodes must not be connected to the same transmission rail of the differential electrical transmission line having fast electrical oscillations. To overcome such a limitation, embodiments of the present invention use an EAM implemented on a semi-insulating (SI) substrate. Accordingly, the proposed TW differential EAM design enables the use of the SerDes in direct modulation mode, while still achieving the bandwidth requirements for XDR and/or GDR.

Embodiments of the present invention will now be described more fully hereinafter with reference to the accompanying drawings, in which some, but not all, embodiments are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, terms such as “top,” “about,” “around,” etc. are used for explanatory purposes in the examples provided below to describe the relative position of certain components or portions of components.

As used herein, the terms “substantially” and “approximately” refer to tolerances within appropriate manufacturing and/or engineering standards or limits.

As used herein, “operatively coupled” may mean that the components are electrically coupled and/or are in or are capable of electrical communication with one another, or are optically coupled and/or are in or are capable of optical communication with one another. Furthermore, “operatively coupled” may mean that the components may be formed integrally with each other or may be formed separately and coupled together. Furthermore, “operatively coupled” may mean that the components may be directly connected to each other or may be connected to each other with one or more components (e.g., connectors, capacitors, and/or the like) located between the components that are operatively coupled together. Furthermore, “operatively coupled” may mean that the components are detachable from each other or that they are permanently coupled together.

Example EAM Device

FIG. 1 illustrates a perspective view of an example differential traveling wave electro-absorption modulator (D-TWEAM) device 100, in accordance with an embodiment of the invention. In an example embodiment, the D-TWEAM device 100 may be monolithically integrated along with the laser source (not shown) and formed on a chip (e.g., on and/or comprising a substrate) so as to provide an integrated laser-modulator chip.

The D-TWEAM device 100 may include an optical waveguide 102. In various embodiments, the optical waveguide 102 may include a ridge waveguide, a buried heterostructure (BH) waveguide, and/or the like. As shown in FIG. 1, the optical waveguide 102 may extend lengthwise in a modulator propagation direction 108. The optical waveguide 102 may include a continuous multiple quantum wells (MQW) layer stack. In some embodiments, the MQW layer stack may be configured to transmit and/or propagate an optical beam and to modulate a continuous wave (CW) light propagating therethrough. For example, in various embodiments, the MQW layer stack may be configured to act as the waveguide core of the optical waveguide 102. The MQW layer stack may include a plurality of quantum wells. For example, the MQW layer stack may include a series of quantum wells disposed between a series of (quantum) barriers. In some embodiments, the MQW stack may be undoped and may form the intrinsic (i) part of the p-i-n junction.

In example embodiments, the MQW layer stack may be formed lengthwise in such a way that the optical waveguide 102 may include alternating active sections 103 and passive sections 107. Here, the modulation of the optical signal primarily occurs in the active sections 103 by applying an electric field on the MQW stack in these sections. In some embodiments, the MQW material in the passive sections 107 may be the same as in the active sections 103. In some other embodiments, the MQW material in the passive sections 107 may be different from the MQW material in the active sections 103 by special treatments during the production process, such as quantum well intermixing (QWI), quantum well disordering (QWD), selective area growth (SAG), etch and regrowth, and the like.

High performance EAMs in III-V material systems are based on Quantum Confined Stark Effect (QCSE). QCSE is a phenomenon in which the electro-optical properties of a semiconductor are affected by an external electric field. In such devices, the optical signal is modulated by an electrical field induced by an RF source into the MQW core of the optical waveguide 102 causing optical absorption of the optical wave propagating therethrough. The optical modulation is induced by an electric field in the intrinsic (i) volume of the p-i-n junction of the optical modulator, which is maintained under a reverse-bias voltage.

As shown in FIG. 1, in some embodiments, the D-TWEAM device 100 may include a segmented structure that has one or more (n) diode segments 104 disposed on the active section 103 of the optical waveguide 102. Each diode segment 104 may include a first electrode 106B and a second electrode 106A. In some embodiments, the first electrode 106B may be a cathode and the second electrode 106A may be an anode. Also, as shown in FIG. 1, The D-TWEAM device 100 may include an electrical transmission line 110 that may be configured to facilitate propagation of an electrical signal therethrough. In some embodiments, the transmission line 110 may be a co-planar strip-line (CPS) transmission line. In one aspect, the diode segments 104 may be disposed on the optical waveguide 102 along the electrical transmission line 110 and may be configured to create discrete capacitive loads on the electrical transmission line 110. In example embodiments, when unloaded, an impedance associated with the electrical transmission line may be within a range of about 80Ω and 200Ω. In various embodiments, the electrical transmission line 110 may be a differential electrical transmission line. In various embodiments, the electrical transmission line 110 may be designed in such a way that the discrete capacitive loads are configured to provide velocity matching between the electrical signal propagating through the electrical transmission line 110 and the optical signal propagating through the optical waveguide 102.

In some embodiments, the electrical transmission line 110 may include a first transmission rail 110A and a second transmission rail 110B. As shown in FIG. 1, the first transmission rail 110A may be disposed along a first side of the waveguide core of the optical waveguide 102. The second transmission rail 110B may be disposed along a second side of the waveguide core of the optical waveguide 102. In some embodiments, the first transmission rail 110A may be disposed on an organic material having a low dielectric constant, such as benzocyclobutene (BCB), as shown in FIG. 3. In some embodiments, the second transmission rail 110B may be disposed on an epitaxial n-type Indium Phosphide (InP) layer.

In some embodiments, each diode segment 104 may be in electrical contact with an electrical transmission line 110 via an electrical contact. In example embodiments, the first electrode 106B of each diode segment 104 may be operatively coupled to the first transmission rail 110A, and the second electrode 106A of each diode segment 104 may be operatively coupled to the second transmission rail 110B. For example, all the anodes 106A of the diode segments 114 may be operatively coupled to the first transmission rail 110A, and all the cathodes 106B of the diode segments 114 may be operatively coupled to the second transmission rail 110B. To this end, the first transmission rail 110A may include a first set of metal traces 112A that are configured to provide an operative coupling between the second electrode 106A of each diode segment 104 and the first transmission rail 110A, and a second set of metal traces 112B that are configured to provide an operative coupling (e.g., electrical contact) between the first electrode 106B of each diode segment 104 and the second transmission rail 110B.

In various embodiments, the electrical transmission line 110 and the metal traces 112 may be formed of metal (e.g., gold, platinum, titanium, and/or the like) and/or another electrically conductive material.

As described herein, driving conventional EMLs using differential RF signaling may present compatibility issues. Conventional EMLs are usually implemented on n-type InP substrates. In such devices, the cathodes of the EAM diodes and the cathodes of the laser diode are operatively coupled to the n-type substrate, resulting in high capacitance to ground. Due to this effect, the cathodes of the segmented diodes must not be connected to any transmission rail where the voltage is oscillating at high frequencies. To overcome such a limitation, in some embodiments, the D-TWEAM device (e.g., D-TWEAM device 100) may be implemented on a semi-insulating (SI) InP substrate 105. SI substrates are often used in the fabrication of semiconductor devices, such as high-frequency transistors, power devices, and optoelectronic devices. SI substrates have low electrical conductivity, high resistivity (e.g., typically higher than $10^7$ Ωcm), and low free-carrier concentrations that may reduce parasitic effects caused by the presence of mobile electrons.

In some embodiments, the electrical signal supplied by the RF source may be efficiently provided to the diode segments 104 via the electrical transmission line 110, e.g., the first transmission rail 110A and the second transmission rail 110B. To this end, the first transmission rail 110A and the second transmission rail 110B may be configured to have low resistance metal to reduce the amount of heat generated as the electrical signal propagates therethrough and maintain the integrity of (e.g., limit the noise introduced into) the electrical signal during propagation.

In some embodiments, the electrical transmission line 110 may be operatively coupled to a radio frequency (RF) source that may be configured to supply an electrical signal (e.g., an output of a radio and/or microwave frequency system) to the D-TWEAM device 100. The RF source may be any signal generator that has a differential output stage. For example, the RF source may be a signal generator (e.g., a digital/analog convertor (DAC)), arbitrary waveform generator (AWG), local oscillator, and/or the like) configured to generate and/or provide a radio and/or microwave frequency electric signal.

In some embodiments, the RF source may be a Serializer-Deserializer (SerDes) transmitter configured to operate in a differential signaling mode. In differential signaling mode, two complementary voltage signals are transmitted via a pair of conductors from the SerDes transmitter. The pair of conductors carry voltage signals that are equal in magnitude, but of opposite polarity. Each conductor in the pair of conductors may provide a driving voltage, $V_{pp}$, of around 0.45V and a source impedance, Zs, that is within a range of about 40Ω to about 50Ω in reference to ground. Therefore, in differential signaling mode, the SerDes transmitter may provide an electrical signal that has a driving voltage, $V_{pp}$, around 0.9V and a source impedance, Zs, that is within a range of about 80Ω to 100Ω. The $V_{pp}$ provided by the SerDes transmitter operating in differential signaling mode is twice the $V_{pp}$ provided by the SerDes transmitter operating in a single-ended signaling mode. Similarly, the Zs provided by the SerDes transmitter operating in differential signaling mode is twice the Zs provided by the SerDes transmitter operating in single-ended signaling mode. As such, differential signaling mode allows for double the signal voltage, common mode and supply noise rejection, improved non-linearity, and the potential for high bandwidth operations.

Power efficiency, availability, and cost of RF sources and/or drivers (e.g., SerDes transmitters) are important factors influencing optical modulator designs for large networks, which may employ a number of such RF sources and/or drivers. In general, the lower the required $V_{pp}$, the simpler, more efficient, and less expensive the RF source and/or driver can be. Practical optical link operation (for SerDes transmitters) requires a dynamic extinction ration (ER) value that is at least 4 dB. To meet the requisite dynamic ER value for XDR and GDR optical links, current EAMs require a minimum $V_{pp}$ of around 0.9V. By operating the SerDes transmitters in differential signaling mode, the required operating range of around 0.9V may be achieved without using any additional power consuming electronic elements (e.g., external driving circuits). In doing so, the SerDes transmitters may be used in a "direct drive" differential modulation mode.

FIG. 2A illustrates a D-TWEAM device operatively coupled to an RF source in a first configuration 200, in accordance with an embodiment of the invention. As shown in FIG. 2A, the D-TWEAM device 100 may be operatively coupled to an RF source 202. As described herein, the RF source may be a SerDes transmitter that is configured to operate in a differential signaling mode. In differential signaling mode, the RF source 202 may include two complementary voltage signals 204A and 204B that are transmitted via a pair of conductors 206A and 206B. The pair of conductors 206A and 206B may carry voltage signals that are equal in magnitude, but of opposite polarity. The pair of conductors 206A and 206B may be operatively coupled to an input end 100A of the D-TWEAM device 100 via DC blocking capacitors 207A and 207B. In this regard, a first conductor 206A may be operatively coupled to the first transmission rail 110A via DC blocking capacitor 207A, and a second conductor 206B may be operatively coupled to the second transmission rail 110B via DC blocking capacitor 207B. In some embodiments, the DC blocking capacitors 207A and 207B may be implemented between the RF source and the D-TWEAM device 100 to separate the RF source from the DC bias sources.

In some embodiments, the output end 100B of the D-TWEAM device 100 may be operatively coupled to a termination load. In this regard, as shown in FIG. 2A, the first transmission rail 110A may be operatively coupled to a termination load TL_A 208A, and the second transmission rail 110B may be operatively coupled to a second termination load TL_B 208B. Termination load TL_A 208A may be operatively coupled to ground via a capacitor 211B. Similarly, termination load TL_B 208B may be operatively coupled to ground via a capacitor 211A. As shown in FIG. 2A, in some embodiments, the terminal load between the first transmission rail 110A and the second transmission rail 110B may include transmission load TL_A 208A and transmission load TL_B 208B connected in series. In some embodiments, the termination loads (terminating resistor or load termination) may be electronic components that are used to match a characteristic impedance of a transmission line.

In some embodiments, each termination load may be operatively coupled to a biasing circuit. In an example embodiment, as shown in FIG. 2A, a second end of the termination load TL_A 208A may be operatively coupled to biasing element 210A and a second end of the termination load TL_B 208B may be operatively coupled to biasing element 210B. The biasing elements 210A and 210B may be operatively coupled to a DC bias source DCBS_A and DCBS_B respectively. In some embodiments, the biasing elements 210A and 210B may be inductors or electrical circuits that include inductors. By applying the biasing elements 210A and 210B at the output end of the termination loads TL_A 208A and TL_B 208B, any direct current (DC) to ground may be eliminated by the capacitors 211A and 211B, thus reducing power consumption.

FIG. 2B illustrates a D-TWEAM device operatively coupled to an RF source in a second configuration 250, in accordance with an embodiment of the invention. As shown in FIG. 2B, biasing circuits 209A and 209B may be introduced in-between the D-TWEAM device 100 and the RF source 202. In particular, the first conductor 206A may be operatively coupled to an input end of biasing circuit 209A and the second conductor 206B may be operatively coupled to an input end of the biasing circuit 209B. The output end of the biasing circuit 209A may be operatively coupled to the first transmission rail 110A and the output end of biasing circuit 209B may be operatively coupled to the second transmission rail 110B at the input end 100A of the D-TWEAM device 100. In some embodiments, the biasing circuits 209A and 209B may be bias-T circuits. As shown in FIG. 2B, in some embodiments, the output end 100B of the D-TWEAM device 100 may be operatively coupled to a termination load TL 208 to avoid signal reflections and standing waves, which can be a source of signal degradation, distortion, or loss.

FIG. 3 illustrates a partial cross-sectional view 300 of the example D-TWEAM device 100 shown in FIG. 1, in accordance with an embodiment of the invention. As shown in FIG. 3, the D-TWEAM device 100 may be grown on an SI InP substrate 105, starting with a highly doped n-InP layer 310 followed by the waveguide MQW core layers 308 and p-type cladding and contact layers 312 and 316 respectively, forming the p-i-n junctions of the waveguide. In some embodiments, the D-TWEAM device may include an epitaxial regrowth of SI InP layers 314 on both sides of the MQW waveguide core layers 308. The various processes, procedures, and/or operations for fabricating embodiments of an exemplary EAM device with a buried heterostructure (BH) waveguide may be performed using conventional methods, portions of which is disclosed in Tamura, M. (2003), "High-speed electroabsorption modulators using ruthenium-doped SI-InP: impact of interdiffusion-free burying technology on E/O modulation characteristics," International Conference on Indium Phosphide and Related Materials, 2003. pp. 491-494, the contents of which are incorporated herein by reference. In addition, the various processes, procedures, and/or operations for fabricating embodiments of an exemplary EAM device with a buried heterostructure (BH) waveguide may be performed using conventional methods, portions of which is disclosed in Nakai, Y. (2019), "Uncooled Operation of 53-GBd PAM4 (106-Gb/s) EA/DFB Lasers With Extremely Low Drive Voltage With 0.9 $V_{pp}$," Journal of Lightwave Technology, Vol. 37, Issue 7, pp. 1658-1662, the contents of which are incorporated herein by reference.

In some embodiments, the first transmission rail 110A may be disposed on an organic material 302 having a low dielectric constant (e.g., benzocyclobutene (BCB)). The organic material 302 may be disposed on a Silicon Nitride (SiN) layer 304. The second transmission rail 110B may be deposited on the (epitaxial) n-type InP layer 310. The cathodes (e.g., cathode 106B in FIG. 1) of each of the diode segments are formed by at least the underlying highly conductive n-type InP layer 310, forming a common cathode diode configuration. The anodes 106A of each of the diode segments are highly isolated along the optical waveguide by conventional treatment of the p-type layers 316 and 312 in the gaps. For this purpose, in some embodiments, conventional methods such as H2 ion plasma passivation, ion implantation, partial etching, and/or the like may be used. In this way, high resistance p-type material may be formed in the gaps between the diode segments and in the gaps between the D-TWEAM and the laser sections when EML's are made. As shown in FIG. 3, the first transmission rail 110A and the anodes 106A may be operatively coupled using metal traces 112A. The various processes, procedures, and/or operations for fabricating embodiments of an exemplary EAM device may be performed using conventional methods, portions of which is disclosed in application Ser. No. 17/810,068, titled, "HIGH BANDWIDTH TRAVELLING WAVE ELECTRO ABSORPTION MODULATOR (EAM) CHIP," the contents of which are incorporated herein by reference.

FIG. 4A illustrates a simulated frequency response curve 400 for a single-ended non-traveling wave EAM device driven by a single-ended RF driver with an active modulator length of 100 microns. Specifically, a frequency response curve of an EAM device with an electrode length, La=100 microns, and a termination load of 50Ω is presented. The EAM device may be directly driven by a single-ended RF source (e.g., differential SerDes transmitter followed by a single-ended driver) or by the signal of one output of a SerDes transmitter in reference to ground that provides a driving voltage, $V_{pp}$~0.45V. As evident from the frequency response curve, with La=100 microns, the EAM device slightly exceeds the XDR bandwidth requirement by achieving an operational bandwidth of 68 GHz.

FIG. 4B illustrates a simulated frequency response curve 450 for a D-TWEAM device driven by a differential RF source with a total active modulator length of 100 microns, in accordance with an embodiment of the invention. Specifically, a frequency response curve of an D-TWEAM device with a segment length, La=50 microns, total number of segments, n=2, and source and termination loads of 86Ω. The total active length of the D-TWEAM device is 100 microns (same as that of the single-ended lumped element device of FIG. 3A). The D-TWEAM device may be directly driven by a differential SerDes transmitter that provides a driving voltage, $V_{pp}$~0.9V, at full swing. As evident from the frequency response curve, with n=2, La=50 microns, and total active length of n*La=100 microns, the D-TWEAM device not only exceeds the XDR bandwidth requirement by achieving an operational bandwidth of 85 GHz, but also outperforms the EAM device of FIG. 4A by being able to utilize the full voltage swing of the SerDes differential source (e.g., 0.9V) directly, and thus having a much higher extinction ratio than the single-ended device of FIG. 3A operating with the same active length at a $V_{pp}$ of 0.45V. This demonstrates the advantages of the invention in comparison of the previous art.

Example Methods for Generating an Optical Output Signal Using an EAM Device

FIG. 5 illustrates a method 500 for generating an optical output signal using a differential traveling wave electro-absorption modulator (D-TWEAM) device, in accordance with an embodiment of the invention. As shown in block 502, the method may include receiving, from a laser source, a continuous wave (CW) light via an optical waveguide, wherein the optical waveguide comprises a segmented structure comprising diode segments disposed thereon, wherein the optical waveguide comprises alternating active sections and passive sections, and wherein each diode segment is disposed on a corresponding active section.

In some embodiments, the EAM device (e.g., D-TWEAM device 100) may be monolithically integrated along with the laser source and formed on a chip (e.g., on and/or comprising a substrate) so as to provide an integrated laser-modulator chip. In one aspect, the laser source may be configured to generate a continuous wave (CW) light and/or laser beam and cause the continuous wave (CW) light and/or laser beam to propagate through the optical waveguide associated with the D-TWEAM device. As described herein, the optical waveguide may include alternating active sections and passive sections, where modulation of the CW laser light primarily occurs in the active sections. Each diode segment may be disposed on a corresponding active section of the optical waveguide.

As shown in block 504, the method may include receiving, from a differential radio frequency (RF) source, an electrical signal having a driving voltage of about 0.9V via an electrical transmission line, wherein the electrical transmission line comprises a first transmission rail and a second transmission rail. In various embodiments, the RF source may be a SerDes transmitter that may be configured to supply a differential electrical signal that has a full voltage swing of about $0.9V_{pp}$. The electrical signal supplied by the RF source may be efficiently provided to the electrode segments via the differential electrical transmission line. The electrical transmission line may include a first transmission rail and a second transmission rail. In various embodiments, the segmented diodes may be connected with the same polarity between first transmission rail and the second transmission rail. For example, the cathodes of the diode segments are connected to the first transmission rail, while and the anodes are connected to the second transmission rail.

As shown in block 506, the method may include generating, using the EAM device, an optical output signal based on at least modulating the CW light. In some embodiments, the EAM device may be configured to modulate the continuous wave (CW) light as it propagates through the optical waveguide to encode and/or embed an information signal thereon.

As shown in block 508, the method includes transmitting the optical output signal via the optical waveguide to an external optical fiber. In some embodiments, the CW light having an information signal encoded and/or embedded thereon may be transmitted to an optical fiber, free space optics, an external destination such as an optical fiber, optical transceiver and/or receiver, and/or the like.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 048833.000145 | To be assigned | LOW VOLTAGE TRAVELING WAVE ELECTRO-ABSORPTION MODULATOR FOR HIGH BANDWIDTH OPERATION | Filed Concurrently Herewith |

What is claimed is:

1. An electro-absorption modulator (EAM) device comprising:
   - an optical waveguide comprising a waveguide core;
   - a segmented structure comprising diode segments disposed on the optical waveguide;
   - a semi-insulating substrate supporting the optical waveguide, wherein the semi-insulating substrate electrically isolates the diode segments from a ground reference to reduce parasitic capacitance between the diode segments and ground, thereby enabling direct differential driving of the EAM device with a full voltage swing from a differential electrical signal; and
   - a differential electrical transmission line operatively coupled to the diode segments, wherein the differential electrical transmission line comprises a first transmission rail and a second transmission rail,
   - wherein the differential electrical transmission line is impedance-matched to a Serializer-Deserializer (SerDes) transmitter based on a geometry and physical layout of the differential electrical transmission line on the semi-insulating substrate, wherein the SerDes transmitter is configured to directly drive the EAM device without an intermediate driver stage.

2. The EAM device of claim 1, wherein the differential electrical transmission line is a co-planar strip-line (CPS) transmission line.

3. The EAM device of claim 1, wherein the optical waveguide comprises at least a ridge waveguide or a buried heterostructure (BH) waveguide.

4. The EAM device of claim 1, wherein the first transmission rail is operatively coupled to a first electrode of each diode segment, and the second transmission rail is operatively coupled to a second electrode of each diode segment.

5. The EAM device of claim 4, wherein the first electrode is a cathode and the second electrode is an anode.

6. The EAM device of claim 1, wherein an output end of the differential electrical transmission line is operatively coupled to a termination load.

7. The EAM device of claim 6, wherein the termination load comprises:
   - a first load resistor comprising a first end and a second end, wherein the first end of the first load resistor is operatively coupled to the first transmission rail, and the second end of the first load resistor is operatively coupled to a ground via a first capacitor; and
   - a second load resistor comprising a first end and a second end, wherein the first end of the second load resistor is operatively coupled to the second transmission rail, and the second end of the second load resistor is operatively coupled to the ground via a second capacitor.

8. The EAM device of claim 1, wherein the first transmission rail is disposed along a first side of the waveguide core, and the second transmission rail is disposed along a second side of the waveguide core.

9. The EAM device of claim 1, wherein the first transmission rail is disposed on an organic material having a low dielectric constant, and the second transmission rail is disposed on an epitaxial n-type Indium Phosphide (InP) layer.

10. The EAM device of claim 1, wherein an impedance associated with the differential electrical transmission line, when unloaded, is within a range of about 80Ω and 200Ω.

11. The EAM device of claim 1, wherein the SerDes transmitter is directly coupled to an input end of the differential electrical transmission line without an intermediate single-ended driver circuit.

12. The EAM device of claim 1, wherein the SerDes transmitter is a differential signal source comprising a differential signal port, wherein the differential signal port is operatively coupled to an input end of the differential electrical transmission line.

13. The EAM device of claim 1, wherein the optical waveguide comprises alternating active sections and passive sections, wherein each diode segment is disposed on a corresponding active section.

14. The EAM device of claim 13, wherein the waveguide core comprises a continuous multi-quantum wells (MQW) layer stack, wherein portions of the MQW layer stack disposed in the active sections have an energy gap defining an active energy gap value, and portions of the MQW layer stack disposed in the passive sections have an energy gap defining a passive energy gap value, wherein the passive energy gap value is greater than the active energy gap value to maintain low insertion loss.

15. The EAM device of claim 1, wherein the EAM device is monolithically integrated along with a laser source on a same chip.

16. The EAM device of claim 1, wherein the diode segments and the differential electrical transmission line are configured to provide velocity matching between the differential electrical signal and an optical signal propagating through the optical waveguide.

17. The EAM device of claim 1, wherein the first transmission rail is disposed on an organic material having a low dielectric constant, and the second transmission rail is disposed on an epitaxial n-type Indium Phosphide (InP) layer.

18. An electro-absorption modulator (EAM) device comprising:
   - an optical waveguide comprising a waveguide core;
   - a segmented structure comprising diode segments disposed on the optical waveguide;
   - a semi-insulating substrate supporting the optical waveguide, wherein the semi-insulating substrate electrically isolates the diode segments from a ground reference to reduce parasitic capacitance between the diode segments and ground, thereby enabling direct differential driving of the EAM device with a full voltage swing from a differential electrical signal; and
   - a differential electrical transmission line operatively coupled to the diode segments, wherein the differential electrical transmission line comprises a first transmission rail and a second transmission rail,
   - wherein the differential electrical transmission line is impedance-matched to a differential radio frequency (RF) source based on a geometry and physical layout of the differential electrical transmission line on the semi-insulating substrate, wherein the RF source is configured to directly drive the EAM device without an intermediate driver stage.

19. A method of generating an optical output signal using an electro-absorption modulator (EAM) device, the method comprising:

receiving, from a laser source, a continuous wave (CW) light via an optical waveguide, wherein the optical waveguide comprises a segmented structure comprising diode segments disposed thereon, wherein the optical waveguide comprises alternating active sections and passive sections, wherein each diode segment is disposed on a corresponding active section;

receiving, from a Serializer-Deserializer (SerDes) transmitter, a differential electrical signal having a driving voltage of about 0.9V via a differential electrical transmission line, wherein the differential electrical transmission line comprises a first transmission rail and a second transmission rail;

generating, using the EAM device, an optical output signal based on at least modulating the CW light; and transmitting the optical output signal via the optical waveguide to an external optical fiber, wherein the differential electrical transmission line is impedance-matched to the SerDes transmitter based on a geometry and physical layout of the differential electrical transmission line on a semi-insulating substrate, wherein the SerDes transmitter is configured to directly drive the EAM device without an intermediate driver stage, wherein the EAM device is formed on the semi-insulating substrate, wherein the semi-insulating substrate electrically isolates the diode segments from a ground reference to reduce parasitic capacitance between the diode segments and ground, thereby enabling direct differential driving of the EAM device with a full voltage swing from the differential electrical signal.

* * * * *